(12) United States Patent
White et al.

(10) Patent No.: US 9,770,765 B2
(45) Date of Patent: Sep. 26, 2017

(54) MATCH DRILLING TOOL, SYSTEM AND METHOD

(71) Applicant: The Boeing Company, Chicago, IL (US)

(72) Inventors: Brandon W. White, Charleston, SC (US); Diego F. Mayorga, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/754,950

(22) Filed: Jun. 30, 2015

(65) Prior Publication Data

US 2017/0001247 A1 Jan. 5, 2017

(51) Int. Cl.
*B23B 49/02* (2006.01)
*B23B 47/28* (2006.01)

(52) U.S. Cl.
CPC ............ *B23B 49/02* (2013.01); *B23B 47/287* (2013.01); *B23B 2215/04* (2013.01); *B23B 2228/36* (2013.01); *B23B 2247/04* (2013.01); *B23B 2247/12* (2013.01); *B23B 2260/134* (2013.01)

(58) Field of Classification Search
CPC . B23B 49/02; B23B 2215/04; B23B 2238/36; B23B 2247/04; B23B 2247/12; B23B 2260/134; B23B 2260/136; B23B 2260/22
USPC ...................................... 408/241 G
See application file for complete search history.

(56) References Cited

U.S. PATENT DOCUMENTS

| | | | | |
|---|---|---|---|---|
| 2,408,595 A | * | 10/1946 | Beard | B23B 49/02 33/578 |
| 2,430,025 A | * | 11/1947 | Mattias | B23B 47/28 408/241 G |
| 2,819,630 A | * | 1/1958 | Whittaker | B23B 47/288 408/30 |
| 4,445,264 A | * | 5/1984 | Banerian | B21D 22/04 29/445 |
| 4,601,618 A | * | 7/1986 | McEldowney | B23B 47/28 408/1 R |
| 5,733,077 A | * | 3/1998 | MacIntosh, Jr. | B23B 47/28 408/103 |
| 6,079,914 A | * | 6/2000 | Peters | B23B 47/28 408/103 |
| 7,484,914 B1 | * | 2/2009 | Weinstein | B23B 47/287 408/103 |

(Continued)

FOREIGN PATENT DOCUMENTS

FR  2912169 A1 *  8/2008  ........... B23B 47/287

OTHER PUBLICATIONS

English translation of FR 2912169 A1, Aug. 2008.*

(Continued)

*Primary Examiner* — Alan Snyder
(74) *Attorney, Agent, or Firm* — Walters & Wasylyna LLC (57) ABSTRACT

A match drilling tool comprising a body comprising a drilling leg and a fixing leg, said drilling leg being separated from said fixing leg by a gap, wherein said drilling leg defines a cutter guide opening, and wherein said fixing leg defines an alignment pin opening, said alignment pin opening being concentric with said cutter guide opening; and an alignment pin slideably received in said alignment pin opening.

20 Claims, 7 Drawing Sheets

(56) References Cited

U.S. PATENT DOCUMENTS

| | | | | |
|---|---|---|---|---|
| 2008/0075549 | A1* | 3/2008 | Kozak | B23B 31/005 |
| | | | | 408/226 |
| 2012/0051865 | A1* | 3/2012 | Liu | B23B 47/28 |
| | | | | 408/108 |
| 2012/0051866 | A1* | 3/2012 | Blick | B23B 47/288 |
| | | | | 408/115 B |
| 2012/0257938 | A1* | 10/2012 | Adkins | B23B 47/288 |
| | | | | 408/115 R |

OTHER PUBLICATIONS

"Tuner Pin Drill Jig," (http://www.stewmac.com/Luthier_Tools/Types_of_Tools/Jigs_and_Fixtures/Tuner_Pin_Drill_Jig.htm).
"Wavery Tuner Drill Jig," (http://www.stewmac.com/Luthier_Tools/Types_of_Tools/Jigs_and_Fixtures/Waverly_Tuner_Drill_Jig.html).

* cited by examiner

MATCH DRILLING TOOL, SYSTEM AND METHOD

FIELD

This application relates to tools and methods for match drilling and, more particularly, to tools and methods for drilling a hole in a first part (e.g., a non-metallic part) that will precisely align with a pre-drilled hole in a second part (e.g., a metallic part).

BACKGROUND

An aircraft fuselage is typically built in sections, which are then assembled to form the fuselage. The fuselage sections often are built at various locations and then transported to an assembly location for final assembly.

The tail-end of a fuselage is typically enclosed by the aft-pressure bulkhead (APB). In certain constructions, the aft-pressure bulkhead is fastened to the adjacent fuselage section using various mounting structures and mechanical fasteners. For example, metallic T-shaped angled brackets, commonly referred to as "T-clips," are connected to the aft-pressure bulkhead, while composite brackets, commonly referred to as splice angles, are connected to the adjacent fuselage section. The aft pressure bulkhead-to-adjacent fuselage section connection is then made by mechanically fastening (e.g., with bolts) the T-clips to the slice angles.

Typically, the T-clips have pre-drilled bolt or rivet holes machined therein, whereas the splice angles do not. Holes in the splice angle must be machined on site at the time of assembly in order to account for slight variances in the alignment of the fuselage sections. Because the T-clips are mounted on the aircraft body, it is not possible to maneuver large precision drilling machines into place to drill the matching holes on the splice angle, so the holes must be hand-drilled.

No current solution supports automation of the fuselage APB join. Pilot holes in the T-clips are lined up with the slice angles, a power feed driller is used to drill full size holes through both parts, as well as through a carbon shim that has been placed therebetween. With a heavy power feed driller, it can be difficult to gauge whether the guide pin is accurately located prior to engaging the drill to operate. If the guide pin is slightly off, the cutter penetrates the material in the wrong location or direction, requiring that both parts be removed and replaced.

It is undesirable to hand-drill the splice angle holes by using the T-clip holes as a guide. The T-clip holes are machined to high precision. Hand drilling through the T-clip holes may result in the drill contacting the sides of the hole, altering the dimensions of the hole and, possibly, putting the T-clips out of specification and requiring re-approval. Correcting such a mis-drilling requires time-consuming deburring and cleaning.

Accordingly, there is a need for drilling splice angle holes that perfectly align with T-clip holes, but without the drill coming into contact with the T-clip.

SUMMARY

In one embodiment, the disclosed match drilling tool may include a body having a drilling leg and a fixing leg, the drilling leg being separated from the fixing leg by a gap, wherein the drilling leg defines a cutter guide opening, and wherein the fixing leg defines an alignment pin opening, the alignment pin opening being concentric with the cutter guide opening; and an alignment pin slideably received in the alignment pin opening.

In one embodiment, the disclosed match drilling system may include a match drilling tool having a body that includes a drilling leg and a fixing leg, the drilling leg being separated from the fixing leg by a gap, wherein the drilling leg defines a cutter guide opening, and wherein the fixing leg defines an alignment pin opening, the alignment pin opening being concentric with the cutter guide opening, and an alignment pin extending at least partially through the alignment pin opening; a part assembly positioned in the gap, the part assembly including at least a pre-drilled part and a target part, the pre-drilled part including a pre-drilled hole, wherein the alignment pin extends into the pre-drilled hole; and a cutter extending through the cutter guide opening into engagement with the target part.

In one embodiment, the disclosed method for concentrically drilling a hole in a part assembly may include the steps of (1) providing a match drilling tool that includes a body having a drilling leg and a fixing leg, the drilling leg being separated from the fixing leg by a gap, wherein the drilling leg defines a cutter guide opening, and wherein the fixing leg defines an alignment pin opening, the alignment pin opening being concentric with the cutter guide opening, and an alignment pin slideably received in the alignment pin opening; (2) positioning the match drilling tool over the part assembly such that the part assembly is in the gap; (3) inserting the alignment pin into a pre-drilled hole in one member of the part assembly; (4) inserting a cutter into the cutter guide opening to drill a through hole in another member of the part assembly; (5) withdrawing the cutter from the cutter guide opening; and (6) withdrawing the alignment pin from the pre-drilled hole and removing the match drilling tool from the part assembly.

In another embodiment, the disclosed method for concentrically drilling a hole in a part assembly may include the steps of (1) fastening a target part and a pre-drilled part to one or more structures, wherein a gap remains between the target part and the pre-drilled part; (2) inserting a temporary shim in the gap between the target part and the pre-drilled part; (3) providing a match drilling tool having a body that includes a drilling leg and a fixing leg, the drilling leg being separated from the fixing leg by a gap, wherein the drilling leg defines a cutter guide opening, and wherein the fixing leg defines an alignment pin opening, the alignment pin opening being concentric with the cutter guide opening, and an alignment pin slideably received in the alignment pin opening; (4) positioning the match drilling tool over the part assembly such that the part assembly is in the gap; (5) inserting the alignment pin into the pre-drilled hole in the pre-drilled part; (6) inserting a cutter into the cutter guide opening to drill a through hole in the target part and a blind hole in the temporary shim concentric with the through hole; (7) withdrawing the cutter from the cutter guide opening; (8) withdrawing the alignment pin from the pre-drilled hole; (9) removing the match drilling tool from the part assembly; (10) removing the temporary shim from the gap between the target part and the pre-drilled part; and (11) installing a permanent shim into the gap between the target part and the pre-drilled part, wherein the permanent shim comprises a shim through hole concentric with the pre-drilled hole and the matching through hole, wherein the shim through hole has a diameter at least as large as the pre-drilled hole and the matching through hole.

Other embodiments of the disclosed match drilling tool, system and method will become apparent from the following detailed description, the accompanying drawings and the appended claims.

DETAILED DESCRIPTION

The disclosed match drilling tool, system and method may allow a user to drill a hole in a part assembly that achieves concentricity with a pre-drilled hole, but without making contact with the part defining the pre-drilled hole. The part assembly may include at least a pre-drilled part having a pre-drilled through hole therein, and a target part in which it is desired to have a matching, concentric hole that will align with the pre-drilled hole.

Figure 5:
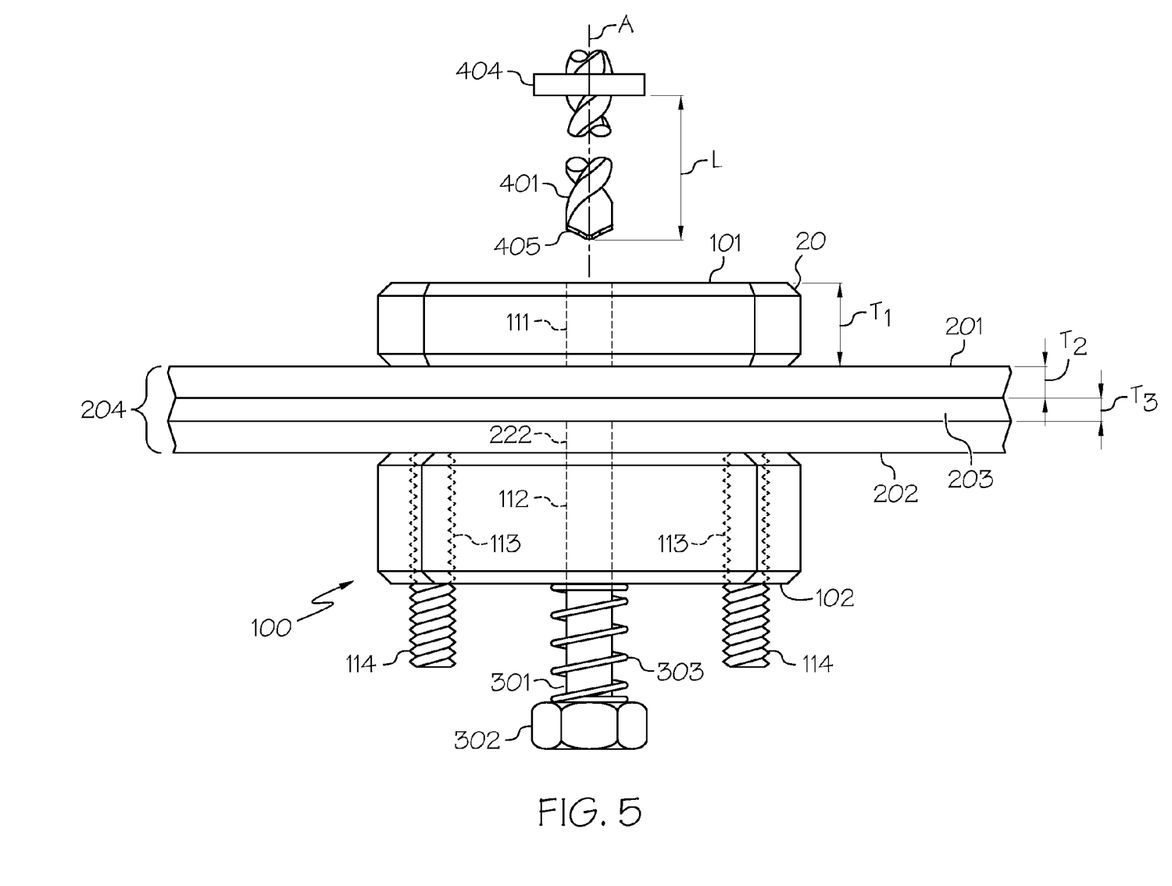
FIG. 5 is a system view of the match drilling tool in use, with a partial cross-sectional view of the part assembly in place, and the cutter.
Figure 6:
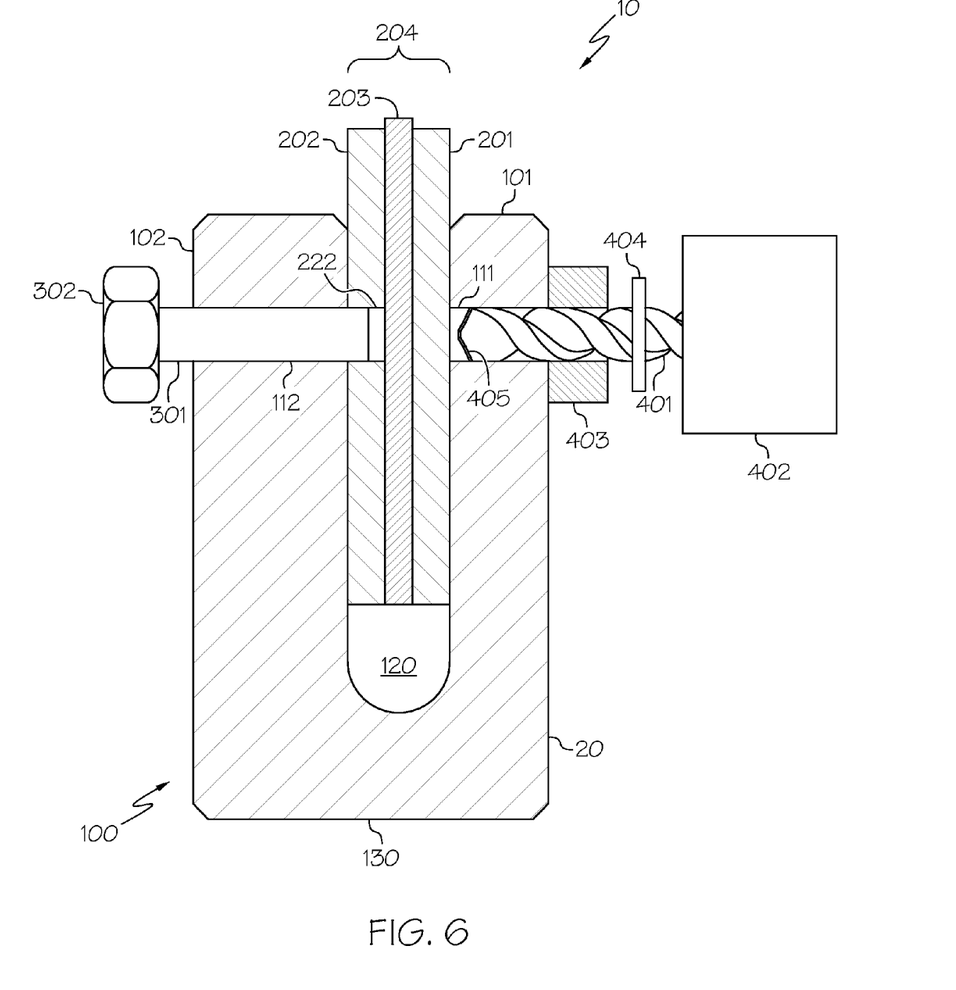
FIG. 6 is a cross-sectional view of the match drilling tool in use, with a partial cross-sectional view of the part assembly in place, and the cutter.

Referring to FIGS. 5 and 6, one embodiment of the disclosed match drilling system, generally designated 10, may include a match drilling tool 100, a part assembly 204 and a cutter 401. The match drilling tool 100 may be positioned over the part assembly 204 such that the cutter 401 may precisely bore a hole in the part assembly 204.

The match drilling tool 100 may include a body 20 and an alignment pin 301. The body 20 may be rigid and generally U-shaped, and may include a drilling leg 101 and a fixing leg 102. The drilling leg 101 may be connected to the fixing leg 102 by a central bridge 130. A gap 120 may be defined between the drilling leg 101 and the fixing leg 102.

The part assembly 204 may include a pre-drilled part 202, a target part 201 and, optionally, a shim 203 positioned between the pre-drilled part 202 and the target part 201. The part assembly 204 may be positioned in the gap 120 of the match drilling tool 100. The drilling leg 101 is designed to abut the target part 201 and the fixing leg 102 is designed to abut the pre-drilled part 202. The pre-drilled part 202 can be, but is not required to be, a metal part, such as a T-clip, and the target part 201 can be, but is not required to be, a composite or non-metallic part, such as a splice angle.

Figure 1:
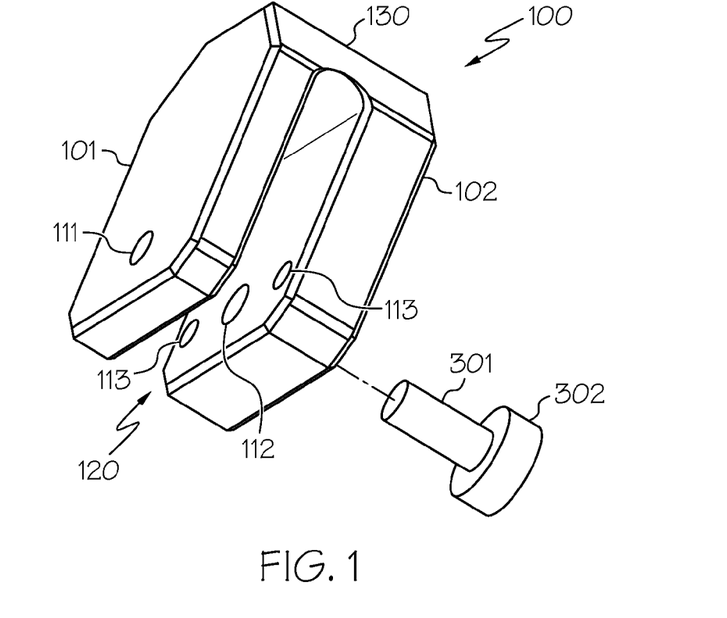
FIG. 1 is a perspective view of one embodiment of the disclosed match drilling tool.
Figure 2:
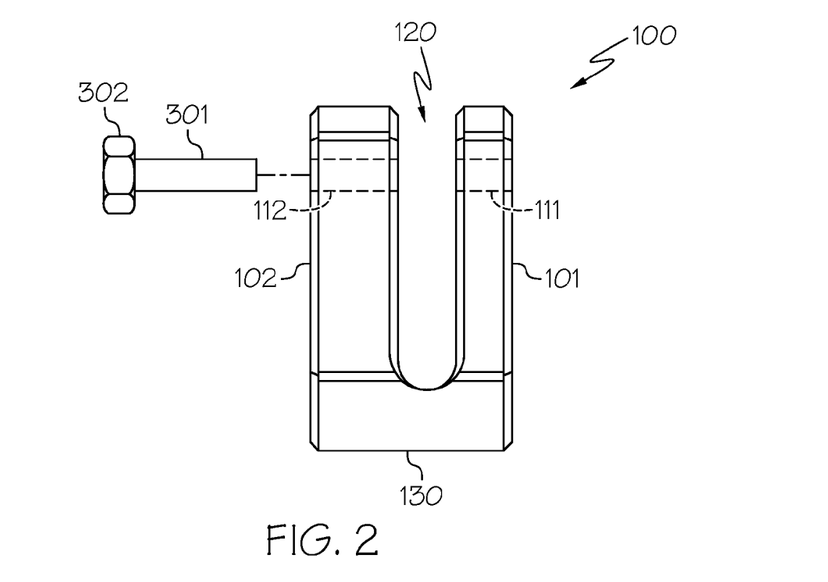
FIG. 2 is a front view of the match drilling tool shown in FIG. 1.
Figure 3:
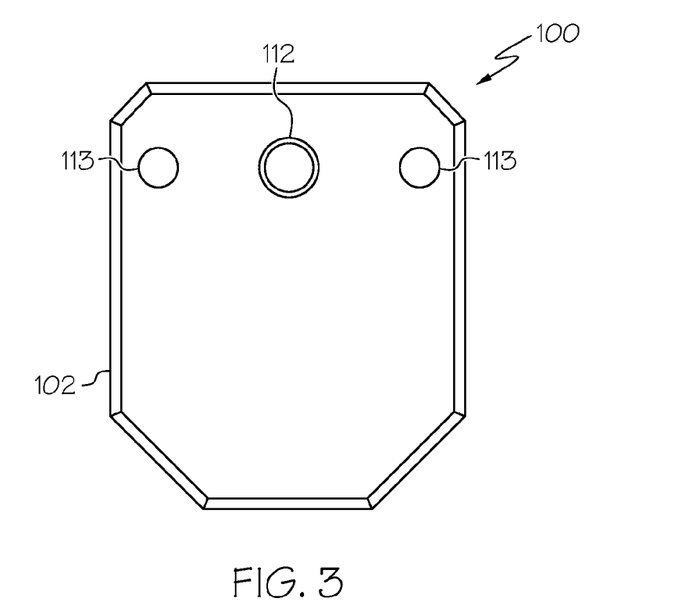
FIG. 3 is a side view of the match drilling tool shown in FIG. 1.

As shown in FIGS. 1-3, the drilling leg 101 of the match drilling tool 100 defines a cutter guide opening 111 that extends through the drilling leg 101. The fixing leg 102 defines an alignment pin opening 112 that extends through the fixing leg 102. The alignment pin opening 112 and cutter guide opening 111 are concentric and may have the same diameter.

Figure 3A:
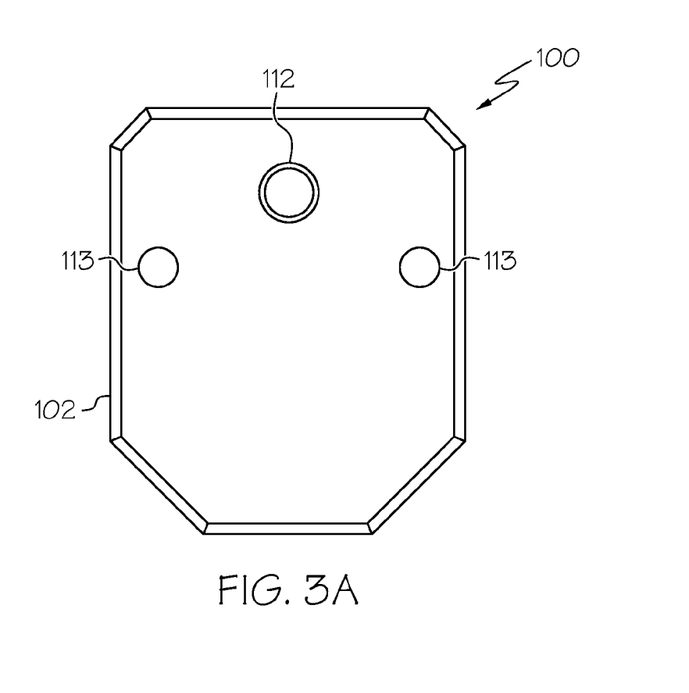
FIG. 3A is a side view of an alternate embodiment of the disclosed match drilling tool.

The fixing leg 102 may further define a plurality of securing holes 113. The securing holes 113 may be sized and shaped to receive securing screws 114 (FIG. 5) in connection with an optional securing feature of the disclosed match drilling tool 100. FIGS. 1-3 show the securing holes 113 aligned with the alignment pin opening 112, while FIG. 3A shows an alternate arrangement wherein the securing holes 113 are offset from the alignment pin opening 112.

Figure 4:
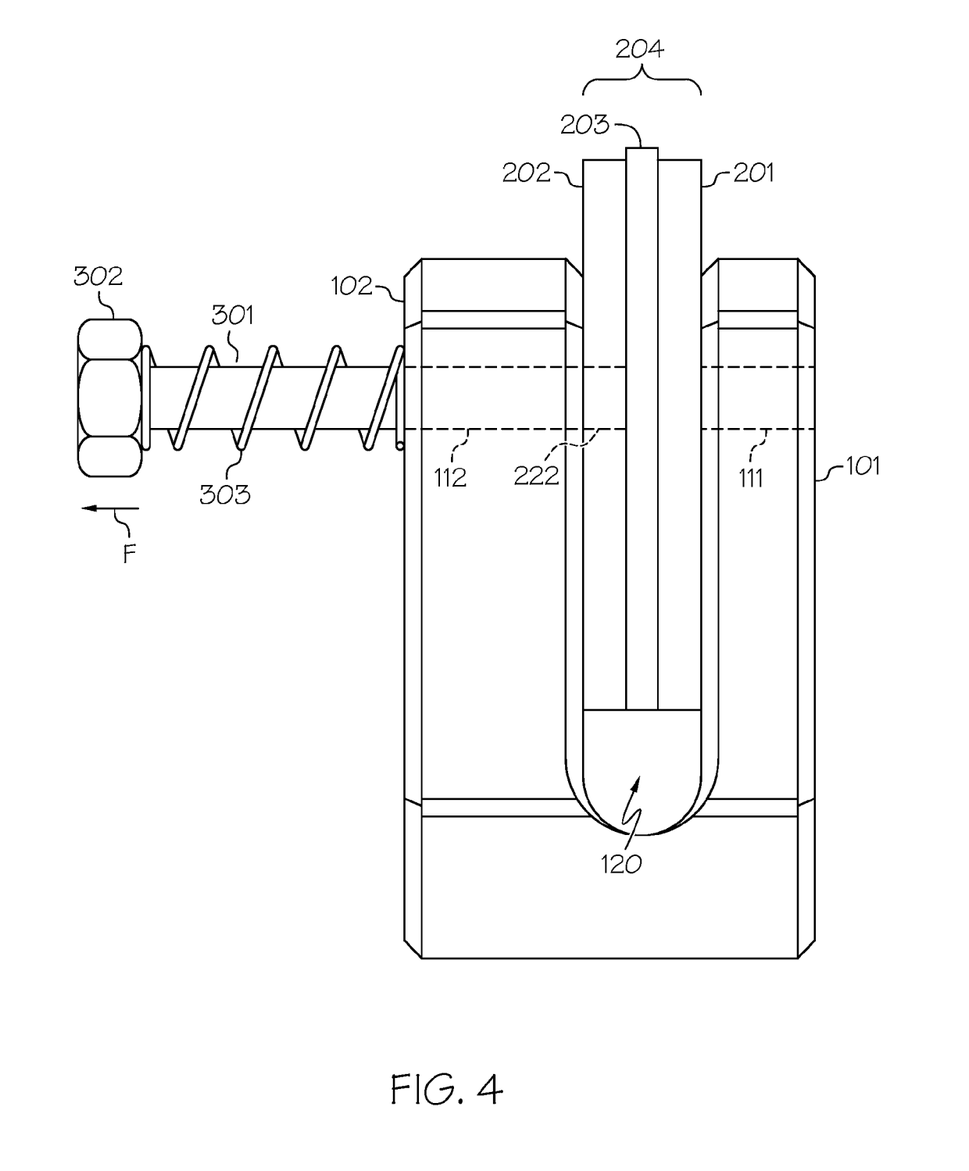
FIG. 4 is a front view of the match drilling tool in use, with the part assembly in place.

As shown in FIG. 4, the pre-drilled part 202 may include a pre-drilled hole 222. In certain applications, this pre-drilled hole 222 may be precisely sized and should not be altered or damaged when the disclosed matched drilling tool 100 is used. The alignment pin 301 of the match drilling tool 100 may extend through the alignment pin opening 112 defined by the fixing leg 102, and may be sized and shaped to engage the pre-drilled hole 222 to accurately align the match drilling tool 100 and the pre-drilled part 202. The alignment pin 301 allows the operator to easily see when the match drilling tool 100 is lined up with the pre-drilled hole 222 of the pre-drilled part 202.

Optionally, a biasing element 303, such as a coil spring, may be operatively connected to the alignment pin 301 to bias the alignment pin 301 toward the drilling leg 101 and into the pre-drilled hole 222 of the pre-drilled part 202. Therefore, as the pre-drilled hole 222 and alignment pin opening 112 align, the biasing element 303 may urge the alignment pin 301 into the pre-drilled hole 222, thereby creating a concentric plane for the drilling leg 101. Concentricity of the holes may be crucial in order for a fastener to fit appropriately.

Also optionally, a knob 302 may be connected to the alignment pin 301 to facilitate manually grasping the alignment pin 301 and moving the alignment pin 301 relative to the alignment pin opening 112. For example, as shown in FIG. 4, prior to positioning the part assembly 204 into the gap 120 of the match drilling tool 100, a pulling force (arrow F) may be applied (e.g., manually) to the knob 302 to withdraw the alignment pin 301 from the gap 120 (e.g., to move the alignment pin 301 to a retracted position). Then, when the knob 302 is released and the pulling force (arrow F) ceases, the biasing element 303 may urge the alignment pin 301 into the gap 120 (e.g., to an engaged position). When the alignment pin opening 112 is aligned with the pre-drilled hole 222 of the pre-drilled part 202, the alignment pin 301 engages the pre-drilled hole 222, thereby aligning the part assembly 204 relative to the match drilling tool 100. A user may manually adjust the part assembly 204 relative to the match drilling tool 100 until the desired engagement of the pre-drilled hole 222 with the alignment pin 301 is achieved.

A securing feature may optionally be used to securely fasten the match drilling tool 100 to the part assembly 204 prior to employing the cutter 401. As shown in FIG. 5, one example embodiment of the securing feature may include screws 114 in threaded engagement with the securing holes 113 in the fixing leg 102. The screws 114 may pass through the fixing leg 102 and contact the part assembly 204, specifically the pre-drilled part 202. The screws 114 may be tightened, which may press the part assembly 204 against the drilling leg 101 in a vise-like arrangement, thereby preventing any of the components of the part assembly 204 from moving out of position.

The screws 114 may be non-marring so as not to damage or mark the part assembly 204 (e.g., the pre-drilled part 202) when the screws 114 are tightened. The exact non-marring feature of the screws 114 is not critical, and various non-marring features may be used. Non-limiting examples of non-marring features suitable for use with the screws 114 include a ball bearing tip, a rubber tip, and a swivel foot. In addition, one or both of the legs 101, 102 of the match drilling tool 100 can be treated or surfaced with a non-marring material.

As shown in FIG. 6, the cutter 401 may be inserted into the cutter guide opening 111 of the drilling leg 101 of the match drilling tool 100, thereby machining a through hole 221 (FIG. 7) in the target part 201. The cutter 401 may by be powered by a motor 402, and may tunnel through the target part 201 and at least partially through the temporary shim 203, thereby creating a blind hole 233 (FIG. 7) in the temporary shim 203. As used herein, "cutter" can encompass any mechanical device capable of machining or milling a hole in a material, and includes, but is not limited to, drills, routers, knives, and grinders.

As shown in FIG. 5, the cutter 401 may be elongated along a longitudinal axis A, and may include a shoulder 404 and a tip 405. The tip 405 of the cutter 401 may be axially opposed from the shoulder 404, thereby defining the length L of the cutter 401. When the cutter 401 is fully inserted into the match drilling tool 100 (by way of the cutter guide opening 111), the shoulder 404 of the cutter 401 may abut the drilling leg 101, thereby preventing the cutter 401 from penetrating further into the part assembly 204. Therefore, the thickness $T_1$ of the drilling leg 101 and the length L of the cutter 401 may define the maximum depth to which the cutter 401 plunges into the part assembly 204.

As note herein, in certain applications it may be important that the cutter 401 not contact the pre-drilled part 202 of the part assembly 204. Therefore, the thickness $T_1$ of the drilling leg 101 and the length L of the cutter 401 may be sized such that the tip 405 of the cutter 401 plunges no deeper than the temporary shim 203. In other words, the length L of the cutter 401 may be greater than the combined thickness $(T_1+T_2)$ of the drilling leg 101 (thickness $T_1$) and the target part 201 (thickness $T_2$), but less than the combined thickness $(T_1+T_2+T_3)$ of the drilling leg 101 (thickness $T_1$), the target part 201 (thickness $T_2$) and the shim 203 (thickness $T_3$).

Optional, a drill stop 403 may be connected to the drilling leg 101, as shown in FIG. 6. The drill stop 403 may be received over, and aligned with, the cutter guide opening 111 such that the shoulder 404 of the cutter 401 engages the drill stop 403 rather than the drilling leg 101, directly. Therefore, the drill stop 403 may effectively increase or decrease (or keep the same) the thickness $T_1$ of the drilling leg 101, thereby modifying the depth to which the cutter 401 plunges into the part assembly 204. The drill stop 403 may be adjustable, such as by way of a threaded engagement between the drill stop 403 and the drilling leg 101, which may facilitate adjusting the effective thickness $T_1$ of the drilling leg 101 and, thus, the depth to which the cutter 401 plunges into the part assembly 204.

Figure 8:
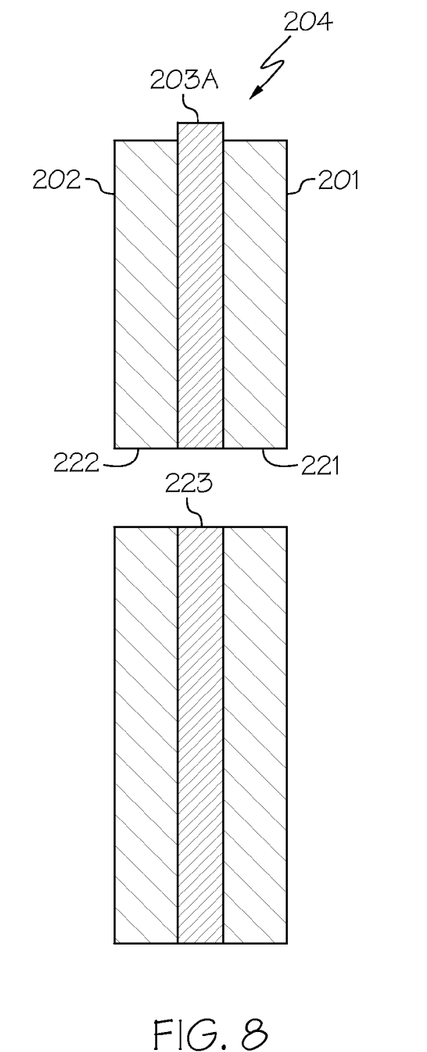
FIG. 8 is a partial cross-sectional view of the part assembly in final form.

Once the through hole 221 has been formed, the cutter 401 may be backed out through the cutter guide opening 111, the securing screws 114 may be loosened, the alignment pin 301 may be withdrawn to the retracted position, and the match drilling tool 100 may be removed from the part assembly 204. The resulting through hole 221 will be precisely aligned with the pre-drilled hole 222. As one option, the temporary shim 203, which may only have a blind hole 233 formed therein, may be removed and replaced with a permanent shim 203A, which may have a through hole 223 formed therein, as shown in FIG. 8. As another option, the blind hole 233 may be hand bored (e.g., with a reamer) to provide a through hole in the shim 203, which may render the temporary shim 203 a permanent shim 203A without the need for swapping shims.

Thus, as shown in FIG. 8, the pre-drilled hole 222 in the drilled part 202 may be aligned with the through hole 221 formed in the target part 201 and the through hole 223 in the shim 203A, thereby forming a concentric through hole through the part assembly 204. If desired, a mechanical fastener, such as a bolt, may be inserted through the through hole in the part assembly 204 to connect the target part 201 with the drilled part 202.

Figure 7:
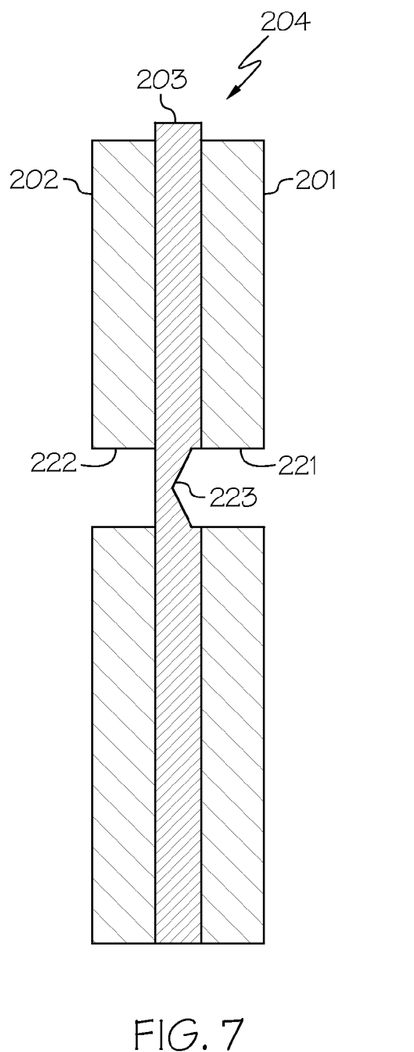
FIG. 7 is a partial cross-sectional view of the part assembly immediately after drilling.

FIGS. 7 and 8 show in more detail how two shims may be used: a sacrificial temporary shim 203 (FIG. 7) and a precision machined permanent shim 203A (FIG. 8), which has through hole 223 machined to match the pre-drilled part 202 pre-drilled hole 222 and the target part 201 through hole 221. The temporary shim 203 is used as a buffer to keep the cutter 401 from contacting the pre-drilled part 202. After the through hole 221 is drilled through the target part 201, the temporary shim 203 is removed and discarded or recycled, and the permanent shim 203A having a shim through hole 223 is installed between the pre-drilled part 202 and the target part 201, with all three holes 221, 222, 223 concentrically aligned. The diameter of the shim through hole 223 can be the same as the other two holes 221, 222, or it can be larger.

Figure 9:
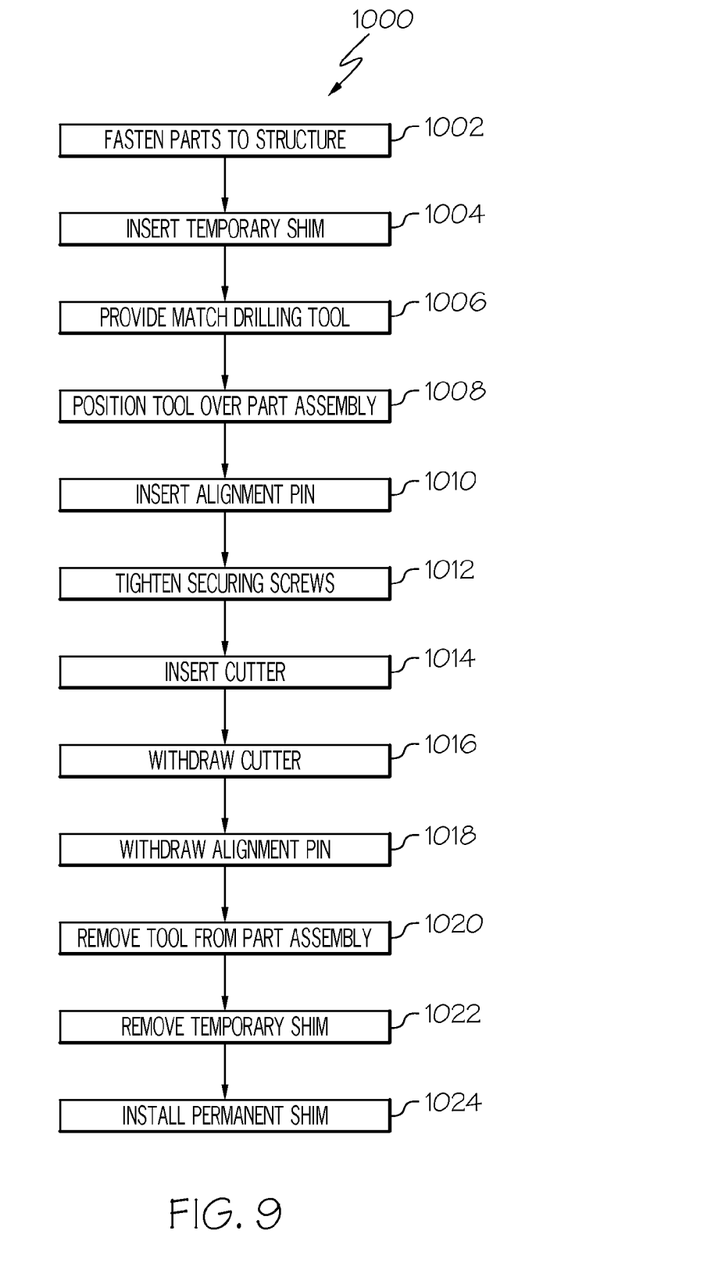
FIG. 9 is a flow diagram depicting one embodiment of the disclosed match drilling method.

Also disclosed is a method for drilling an opening in a target part concentrically with an existing through hole in a pre-drilled part. One embodiment of the disclosed match drilling method, generally designated 1000, is shown in FIG. 9. The method 100 may begin at Block 1002.

At Block 1002, the target part 201 and the pre-drilled part 202 may optionally be fastened to one or more structures. A gap 120 may remain between the target part 201 and the pre-drilled part 202. Therefore, as shown at Block 1004, a temporary shim 203 may be inserted into the gap between the target part 201 and the pre-drilled part 202.

At Block 1006, a match drilling tool 100 may be provided. The match drilling tool 100 may be positioned over the part assembly (Block 1008) and the alignment pin 301 of a match drilling tool 100 may be inserted into the pre-drilled hole 222 in the pre-drilled part 202 (Block 1010). Optionally, at Block 1012, one or more securing screws 114 may be tightened against the pre-drilled part 202 to clamp the target part 201, the temporary shim 203, and the pre-drilled part 202 within the match drilling tool 100.

At Block 1014, a cutter guide opening 111 in the drilling leg 101 of the match drilling tool 100 may be used as a guide for drilling a matching through hole 221 in the target part 201, wherein the cutter guide opening 111 in the drilling leg 101 of the match drilling tool 100 is concentric with the alignment pin 301 of the match drilling tool 100. Optionally, a drill stop 403 of the match drilling tool 100 may be used to ensure the desired plunge depth of the cutter.

With the through hole 221 formed, the cutter 401 may be withdrawn from the cutter guide opening 111 (Block 1016). Then, the alignment pin 301 may be withdrawn (Block 1018) and the match drilling tool 100 may be removed from the part assembly 204 (Block 1020).

Optionally, the temporary shim 203 may be removed from the gap 120 between the target part 201 and the pre-drilled part 202 (Block 1022), and a permanent shim 203A may be installed (Block 1024). The permanent shim 203A may include a shim through hole 223 concentric with the pre-drilled hole 222 in the pre-drilled part 202 and the through hole 221 in the target part 201. The shim through hole 223 may have a diameter at least as large as the pre-drilled hole 222 and the through hole 221.

Accordingly, the disclosed match drilling tool, system and method may be used to form a precisely concentric through hole in a part assembly that includes at least a first member and a second member, wherein one of the members has a pre-drilled through hole formed therein. Significantly, the precisely concentric through hole may be formed without passing a cutter through the pre-drilled through hole and without contacting the member with the pre-drilled through hole.

Thus, the disclosed match drilling tool, system and method may save time and cost by allowing machinists to keep components fastened, without removal, while assembling components. This may reduce labor hours in production as well as costs associated with rework and non-conforming material. This may allow an operator to keep surrounding components installed while being able to drill through only one material without needing a cleaning and de-burring processes for the pre-drilled part. The part assembly is not limited to composite parts and metallic parts, and would work with any delicate or precision part that requires drilling or machining to concentrically align with an existing hole in a part.

Although various embodiments of the disclosed match drilling tool, system and method have been shown and described, modifications may occur to those skilled in the art upon reading the specification. The present application includes such modifications and is limited only by the scope of the claims.

What is claimed is:

1. A match drilling system comprising:
    a match drilling tool comprising:
        a body comprising a drilling leg and a fixing leg, said drilling leg being separated from said fixing leg by a gap, wherein said drilling leg defines a cutter guide opening, and wherein said fixing leg defines an alignment pin opening, said alignment pin opening being concentric with said cutter guide opening; and
        an alignment pin received in said alignment pin opening;
    a part assembly positioned in said gap, said part assembly comprising at least a pre-drilled part, a target part and a shim positioned between said pre-drilled part and said target part, said pre-drilled part comprising a pre-drilled hole, wherein said alignment pin is biased into said pre-drilled hole;
    a cutter extending through said cutter guide opening into engagement with said target part, said cutter comprises a shoulder axially opposed from a tip, and defining a length from said tip to said shoulder, wherein said length exceeds a combined thickness of said drilling leg and said target part, and wherein said length is less than a combined thickness of said drilling leg, said target part and said shim, thereby ensuring said cutter is capable of forming a through hole in said target part without said cutter contacting said pre-drilled part; and
    a screw threadingly engaged with said fixing leg and in contact with said part assembly.

2. The match drilling system of claim 1 wherein said shoulder is engaged with said drilling leg.

3. The match drilling system of claim 1 wherein said pre-drilled part is metallic and said target part is non-metallic.

4. The match drilling system of claim 1 further comprising a biasing element operatively connected to said alignment pin to bias said alignment pin into said pre-drilled hole.

5. The match drilling system of claim 1 wherein said alignment pin is connected to a knob.

6. The match drilling system of claim 1 wherein said alignment pin is moveable relative to said alignment pin opening between at least an engaged position, wherein said alignment pin protrudes into said pre-drilled hole, and a retracted position, wherein said alignment pin is withdrawn from said pre-drilled hole.

7. The match drilling system of claim 1 wherein said screw comprises a swivel foot.

8. The match drilling system of claim 1 wherein said screw comprises a rubber tip.

9. The match drilling system of claim 1 further comprising a non-marring material on at least one of said drilling leg and said fixing leg.

10. The match drilling system of claim 1 wherein said alignment pin is connected to a knob.

11. The match drilling system of claim 1 wherein said pre-drilled part is a T-clip.

12. The match drilling system of claim 11 wherein said target part is a splice angle.

13. The match drilling system of claim 1 further comprising a motor operatively connected to said cutter.

14. The match drilling system of claim 1 wherein said cutter is a drill bit.

15. The match drilling system of claim 1 wherein said drilling leg comprises a drill stop.

16. The match drilling system of claim 15 wherein said drill stop is adjustable to adjust the thickness of said drilling leg.

17. The match drilling system of claim 1 wherein said drilling leg is connected to said fixing leg by a central bridge.

18. The match drilling system of claim 1 wherein said alignment pin opening and said cutter guide opening have the same diameter.

19. The match drilling system of claim 4 wherein said biasing element is a coil spring.

20. The match drilling system of claim 1 wherein said screw is in contact with said pre-drilled part.

* * * * *